(No Model.)

W. A. HOEVELER.
VACUUM PAN.

No. 277,280. Patented May 8, 1883.

Witnesses.
Thomas J. Patterson
Saml. Cunningham

Inventor.
William A. Hoeveler
Connolly Bros & McTighe, Attys

UNITED STATES PATENT OFFICE.

WILLIAM A. HOEVELER, OF PITTSBURG, PENNSYLVANIA.

VACUUM-PAN.

SPECIFICATION forming part of Letters Patent No. 277,280, dated May 8, 1883.

Application filed February 19, 1883. (No model.)

*To all whom it may concern:*

Be it known that I, WILLIAM A. HOEVELER, of Pittsburg, in the county of Allegheny and State of Pennsylvania, have invented certain new and useful Improvements in Process of and Apparatus for Evaporating Liquids; and I do hereby declare that the following is a full, clear, and exact description of the invention, which will enable others skilled in the art to which it appertains to make and use the same, reference being had to the accompanying drawings, which form a part of this specification, in which—

Figure 1:
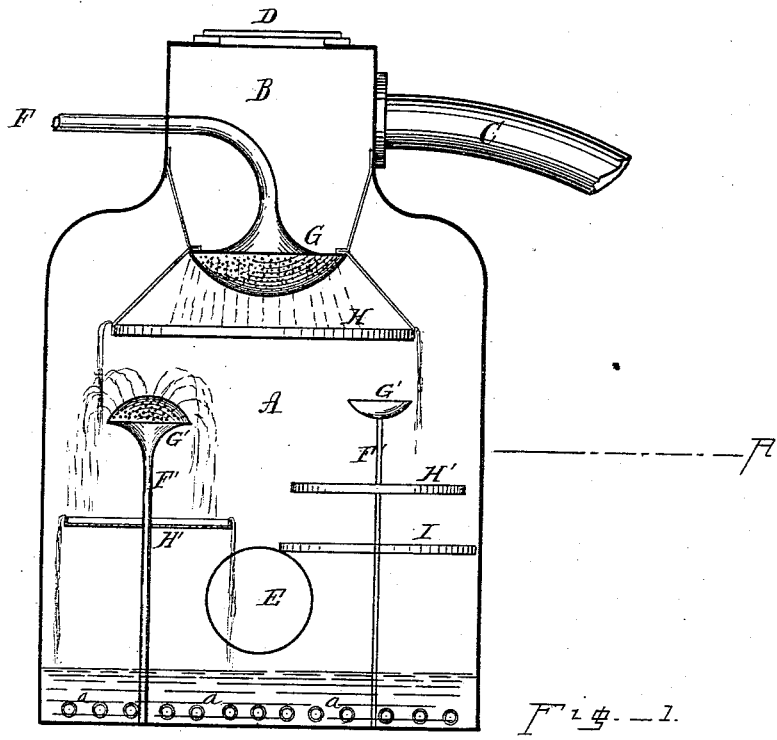
Figure 2:
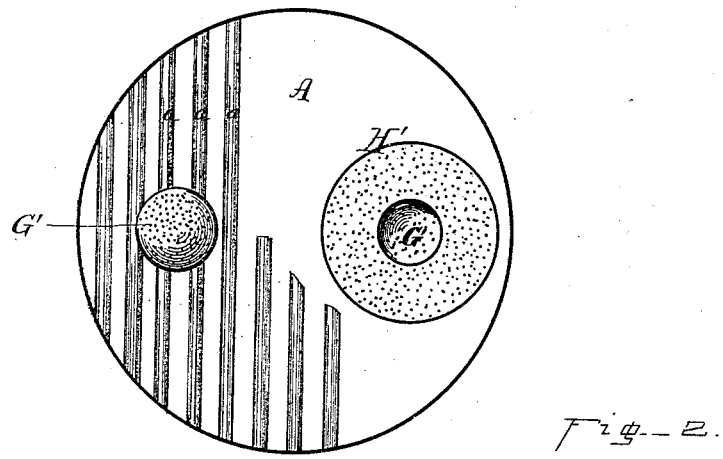

Figure 1 is an elevated section of a vacuum-pan, showing the application of my invention. Fig. 2 is a plan section on line R of Fig. 1.

This invention relates to an improved apparatus for evaporating liquids.

The invention is intended especially for application to the vacuum process of evaporation; and it consists in the apparatus hereinafter fully described and claimed.

My invention may be readily applied to all the principal forms of vacuum-pans now in use.

In the drawings, A designates one of the common forms, having the heating-pipes *a* crossing at the bottom inside, and having the neck B, the exhaust C, and the man-holes D and E.

Entering the vessel A at a point in the neck is a pipe, F, through which the liquid under manipulation is to pass. Pipe F bends downwardly and terminates in the rose or shower head G, suitably supported.

Some distance under the head G, I hang a tray, H, having upturned edges and perforated on its horizontal portion. The liquid coming through pipe F emerges from head G in the form of a spray or shower, and falls in a finely-divided state through the exhausted atmosphere of the pan or vessel A, and is therefore subjected to the evaporative influence on all sides. Consequently the evaporation is very rapid.

To further increase the result by redividing the liquid, (which in falling tends to reunite into larger drops,) I use the tray H beneath. The tray catches the liquid, and has its perforations so graduated to the amount falling from head G that they will not pass it freely, and thus the tray gradually fills while acting as a sieve itself, and the surplus flows off the edge or rim in a sheet, thus doubly exposing the liquid to the evaporative influence. Finally the liquid falls to the bottom of the vessel A, and there undergoes the common process of evaporation, in addition to the foregoing.

Instead of or coincident with the introduction through the head G, the liquid may be forced into the pan A through a number of vertical pipes, F', which may have the rose-head G' or tray H', which in turn may have the supplemental tray or trays I, as shown. The result is the same in kind and differs only in degree.

In all cases the liquid is introduced at an elevation and admitted to the vessel in a divided or sheet condition, and then allowed to fall through the atmosphere of the pan. The advantage of this falling through the exhausted atmosphere of a vacuum-pan is very obvious. It causes a very great surface of liquid to be exposed in a very small space comparatively, and effects a very rapid evaporation at a comparatively low temperature.

Before introducing the liquid it should be heated to as high a temperature as the liquor will allow of. I can very rapidly evaporate "glue-liquor" at as low a temperature as 160° Fahrenheit by my said apparatus, and hence obtain a very fine stock, because of such low temperature not injuring the material. Other liquors may be heated much more before introducing, depending upon what heat they will take without injury.

I claim as my invention—

1. The combination of the pan A, exhaust C, and inlet-pipe F or F', having the rose or shower head G or G', substantially as described.

2. In combination with the vacuum-pan A, the inlet-pipe F or F', rose or shower head G or G', and the imperforate tray H, located beneath said shower-head, substantially as described.

3. In combination with the vacuum-pan A, the inlet-pipe F, rose or shower head G, and the tray H, perforated and rimmed at its periphery, substantially as described.

In testimony that I claim the foregoing as my own I have hereto affixed my signature in presence of two witnesses.

WILLIAM A. HOEVELER.

Witnesses:
T. J. MCTIGHE,
THOMAS J. PATTERSON.